United States Patent
Gautier et al.

(10) Patent No.: US 9,880,294 B2
(45) Date of Patent: Jan. 30, 2018

(54) RARE-EARTH HALIDE CRYSTAL SCINTILLATOR WITH POLISHED SENSITIVE FACE

(71) Applicant: Saint-Gobain Cristaux Et Detecteurs, Courbevoie (FR)

(72) Inventors: Guillaume Gautier, Mennecy (FR); Dominique Richaud, Fontainebleau (FR); Patrick Champeaux, Courcelles (FR)

(73) Assignee: SAINT-GOBAIN CRISTAUX ET DETECTEURS, Courbevoie (FR)

( * ) Notice: Subject to any disclaimer, the term of this patent is extended or adjusted under 35 U.S.C. 154(b) by 0 days.

(21) Appl. No.: 14/958,748

(22) Filed: Dec. 3, 2015

(65) Prior Publication Data

US 2016/0084965 A1    Mar. 24, 2016

Related U.S. Application Data

(63) Continuation of application No. 13/519,834, filed as application No. PCT/FR2010/052875 on Dec. 22, 2010, now Pat. No. 9,229,118.

(30) Foreign Application Priority Data

Dec. 28, 2009   (FR) ...................................... 09 59620

(51) Int. Cl.
    *G01T 1/20*     (2006.01)
    *G01T 1/202*    (2006.01)

(52) U.S. Cl.
    CPC .................................. *G01T 1/202* (2013.01)

(58) Field of Classification Search
    None
    See application file for complete search history.

(56) References Cited

U.S. PATENT DOCUMENTS

| 3,837,882 | A | | 9/1974 | Swinehart et al. |
| 4,145,609 | A | * | 3/1979 | Takami ................. G01T 1/1642 |
| | | | | 250/361 R |
| 5,013,921 | A | | 5/1991 | Bruening et al. |
| 5,091,650 | A | | 2/1992 | Uchida et al. |

(Continued)

FOREIGN PATENT DOCUMENTS

| JP | H09-061533 A | 3/1997 |
| UA | 80507 | 9/2007 |
| WO | 2009/129534 A2 | 10/2009 |

OTHER PUBLICATIONS

International Search Report from International Application No. PCT/FR2010/052875 dated Jun. 21, 2011 (2 pgs).

(Continued)

*Primary Examiner* — Edwin Gunberg
(74) *Attorney, Agent, or Firm* — Abel Law Group, LLP

(57) ABSTRACT

A single-crystal scintillator material can include at least 50 wt % of rare-earth halide and comprising a polished first face. This material is integrated into an ionizing-radiation detector comprising a photoreceiver, the photoreceiver being optically coupled to the material via a face other than the polished first face. The material provides a good energy resolution and a high light intensity. The polishing may be carried out whatever the crystal orientation of the crystal. Loss of material due to this orientation is therefore prevented.

20 Claims, 1 Drawing Sheet

(56) References Cited

U.S. PATENT DOCUMENTS

| | | |
|---|---|---|
| 6,534,771 B1 | 3/2003 | Rozsa |
| 6,783,434 B1 | 8/2004 | Akahori et al. |
| 7,067,815 B2 | 6/2006 | Dorenbos et al. |
| 7,067,816 B2 | 6/2006 | Dorenbos et al. |
| 7,233,006 B2 | 6/2007 | Dorenbos et al. |
| 7,250,609 B2 | 7/2007 | Dorenbos et al. |
| 7,608,201 B2 | 10/2009 | Iltis |
| 7,670,578 B2 | 3/2010 | Iltis |
| 7,884,316 B1* | 2/2011 | Menge ............... G01T 1/20 250/261 |
| 2004/0178346 A1 | 9/2004 | Williams et al. |
| 2005/0104001 A1 | 5/2005 | Shah |
| 2006/0104880 A1 | 5/2006 | Iltis |
| 2006/0202125 A1 | 9/2006 | Avraham |
| 2007/0241284 A1 | 10/2007 | Iltis |
| 2008/0188914 A1 | 8/2008 | Gustavsson |
| 2010/0163735 A1* | 7/2010 | Menge ............ C09K 11/7704 250/361 R |

OTHER PUBLICATIONS

Higgins, W. M., et al., "Crystal growth of large diameter LaBr3:Ce and CeBr3," Journal of Crystal Growth, Elsevier, Amsterdam, NL, vol. 310, No. 7-9, Apr. 1, 2008, pp. 2085-2089, XP022697586.

* cited by examiner

RARE-EARTH HALIDE CRYSTAL SCINTILLATOR WITH POLISHED SENSITIVE FACE

CROSS-REFERENCE TO RELATED APPLICATION(S)

This application is a continuation and claims priority to U.S. patent application Ser. No. 13/519,834, entitled RARE-EARTH HALIDE CRYSTAL SCINTILLATOR WITH POLISHED SENSITIVE FACE, by Guillaume Gautier et al., filed Jun. 28, 2012, which is a national stage entry under 35 U.S.C. §371 of International Application No. PCT/FR2010/052875 filed Dec. 22, 2010, entitled "Scintillateur en Halogenure de Terre Rare Cristallin a Face Sensible Polie," by Gautier et al. and claims priority under 35 U.S.C. §119(b) to French Patent Application No. 0959620, filed Dec. 28, 2009, entitled "Scintillateur en Halogenure de Terre Rare Cristallin a Face Sensible Polie," by Gautier et al., of which all applications are assigned to the current assignee hereof and incorporated herein by reference in their entirety.

FIELD OF THE INVENTION

The invention relates to the field of scintillators comprising a rare-earth halide, used for detecting low-energy X-rays and gamma-rays and ionizing particles.

DESCRIPTION OF THE RELATED ART

Ionizing radiation (including ionizing particles such as, in particular, protons, neutrons, electrons, alpha-particles, ions, and X-rays or gamma-rays) are customarily detected using single-crystal scintillators that convert the incident radiation into light, which is then transformed into an electrical signal using a photoreceiver such as a photomultiplier. The scintillators used may especially be single crystals of thallium-doped sodium iodide (referred to in the following as NaI (Tl)), sodium- or thallium-doped cesium iodide or a praseodymium- or cerium-doped lanthanum halide. Crystals based on the lanthanum halides have been the subject of recent work such as that published in U.S. Pat. No. 7,067, 815, U.S. Pat. No. 7,067,816, US 2005/188914, US 2006/104880 and US 2007/241284. These crystals show promise in terms of light intensity and resolution but particular care must be taken with them due to their hygroscopic nature.

X-rays, gamma-rays and low-energy particles are conventionally detected by scintillator crystals the most widely used of which is NaI(Tl). On account of the nature of the radiation (rays or particles) to be analyzed, penetrating matter only shallowly, the first few atomic layers at the surface of the crystal are of crucial importance. These layers must correctly reproduce the crystal lattice, which is not compatible with working of the surface. In the prior art, the crystals are therefore cleaved in order to generate a surface that preserves intact the underlying crystal structure. Therefore a cleaved surface is used as the sensitive detection surface. In the case of NaI(Tl) it is not possible to replace cleaving with another method because this results in too great a deterioration in the detection quality (poor energy resolution and small amount of light generated by the scintillator, compared to what may be obtained with a cleave).

A new generation of scintillators based on rare-earth halides has appeared in recent years. They are especially described in U.S. Pat. No. 7,067,815, U.S. Pat. No. 7,233, 006, U.S. Pat. No. 7,067,816 and U.S. Pat. No. 7,250,609.

Such scintillators are commercially available, and have a cleaved surface as the radiation-receiving surface. Rare-earth halides emit in the wavelength range between 300 and 530 nm. Pr- or Ce-doped lanthanum halides emit between 300 and 400 nm.

A crystal cleaves along preferred crystal planes, thus a crystal oriented in a precise direction must be selected in order to carry out the cleaving operation, on the one hand, and to optimize performance with respect to the final application, on the other. This necessary orientation lowers the yield since incorrectly oriented material cannot be used. The cleaving operation may also fail (chips or cracks may be generated), which also leads to scrap.

U.S. Pat. No. 5,013,921 teaches the use of scintillator materials having polished surfaces in a radiography application, which generally requires energies of about 60 keV. Photodiodes based on amorphous hydrogenated silicon are used for the detection and are placed directly on the surface of the scintillator. These photodiodes are sensitive significantly above a wavelength of 550 nm.

UA 80507 teaches a polished europium-doped alkali halide single-crystal scintillator.

WO 2009/129534 teaches a crystal the polished face of which is directed toward a photodetector, thereby not requiring a very fine polish. Moreover, in this document, a polished face is placed in the same plane as a sandblasted or rough face.

US 2005/0104001 teaches a crystal polished for positron emission tomography (PET) application. The degree of polishing and the use made of the polished face are not explained. In PET applications, the incident radiation has an energy of 511 keV. It is not possible to extrapolate the low-energy properties of a crystal from its properties in PET.

DETAILED DESCRIPTION

Figure 1:
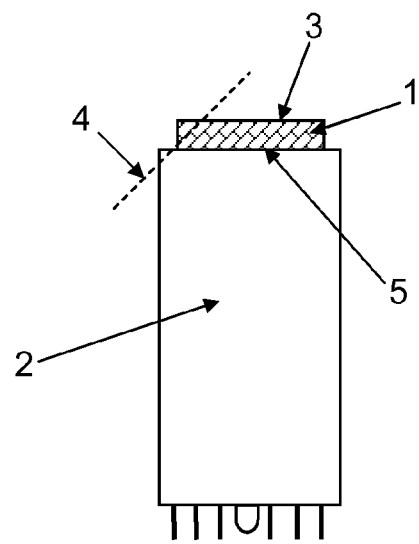
FIG. 1 includes an illustration of a scintillator crystal and a photomultiplier tube.

It has now been found that it is possible to replace the cleave with a polish, in the case of crystals based on rare-earth halides, without degrading the essential properties such as the energy resolution or the amount of light generated by the scintillator. In addition, this polishing may be carried out whatever the crystal orientation of the crystal. It is no longer necessary to orient the crystal (i.e. to position it so that the intended radiation-sensitive face coincides with a cleavage plane). The loss of material due to this orientation is prevented. The surface finish obtained by polishing is much more reproducible, compared to a conventional cleave which consists in using a shock to separate two crystal planes.

Thus, the invention firstly relates to a single-crystal scintillator material comprising at least 50 wt % of a rare-earth halide, and comprising a polished face called the "polished first face". This polished face may be the only polished face. However, at least one other face of the single crystal may also be polished.

The polished material according to an embodiment of the invention allows good low-energy-radiation measurement performance to be obtained because excellent crystal quality at small distances beneath the surface can be preserved. It is at this depth that low-energy radiation interacts with the crystal.

The required performance parameters are the energy resolution (called PHR for pulse height resolution) and the peak/valley (P/V) ratio, which is obtained by dividing the number of counts detected at the maximum of the peak of the ionizing radiation source by the minimum number of counts between the source peak and the noise peak present in the low channels (to the left of the source peak)—the higher the P/V ratio, the better the signal-to-noise ratio. The energy resolution PHR is measured by recording a spectrum representing the activity of a source as a function of energy, this spectrum describing the full width at half maximum of a peak which divided by the energy (abscissa of the peak maximum) gives the PHR—the lower the PHR, the better the spectral resolution.

The scintillation performance (PHR and P/V) of the single crystal may be evaluated by measuring the PHR and P/V ratio with an $Fe^{55}$ source at 5.9 keV. If the light emission characteristics are good when an $Fe^{55}$ source at 5.9 keV is used, then the light emission characteristics will also be good (but with possibly different PHR and P/V values) with other sources.

A person skilled in the art would consider the following performance in the case of an $Fe^{55}$ source at 5.9 keV satisfactory: PHR≤50% and P/V≥35.

The expressions "low-energy X-radiation" and "low-energy gamma-radiation" are understood to mean radiation lying in the range from 1 to 100 keV, more particularly 1 to 50 keV and even more particularly from 1 to 10 keV. The invention also relates to the use of the detector according to an embodiment to detect radiation having an energy in the range given above. The invention also relates to a method of detecting this type of radiation using the detector according to an embodiment, the polished first face being positioned to interact with the ionizing radiation (i.e. it is the incident face).

The polished face of the crystal according to an embodiment of the invention ("polished first face") may be produced whatever the crystal orientation of the scintillator material. A suitable polish may be obtained by mechanical and chemical action. Generally, most of the worked thickness is first removed from the surface formed during the machining, e.g., cutting. The crystal is provided with thickness allowance with respect to the target size. After the machining, first the surface is ground using an abrasive cloth, for example a 280 grit cloth (grit=number of openings per square inch in a screen filtering the abrasive particles). Next the polishing is performed. The polishing employed in the context of an embodiment of the present invention is more involved than that used when a simple optical coupling is required (polished face turned toward the photoreceiver). This polishing is advantageously carried out using a mixture of abrasive particles and alcohol, especially at the end of the polishing. To do this, it is possible to rub the crystal by pressing it lightly against a polisher, for example with a mixture of alcohol and alumina. The alcohol is advantageously ethanol. The subsequent polishing step consists of a finer polishing operation: on a support with a mixture of alcohol and diamond powder the crystal is rubbed at some length, and evenly over the entire surface of the polisher, without applying pressure. This operation is continued until any protrusions, scratches, even fine scratches, and above all any "orange peel" appearance, have disappeared. In the final polishing operation, the polishing is this time performed with a reduced amount of diamond powder, though still in alcohol. Beforehand, the polisher is washed copiously in alcohol. Water present in a very small amount in the alcohol (for example about 0.1% of water in alcohol for a crystal based on lanthanum bromide or chloride) seems to play a positive role since water dissolves the material very slightly when the latter is hygroscopic, which is the case for these crystals. Preferably the alcohol contains from 0.01 to 1 wt % of water. The crystal is generally rubbed a number of times, slowly, on the support of the polisher. Advantageously, the abrasive particles (alumina, diamond powder, silicon carbide, etc.) used at the end of the polishing have a diameter of 4 μm or less (each abrasive particle can be contained in a 4 μm diameter sphere). Preferably, the particles have a diameter of 3 μm or less (each abrasive particle can be contained in a 3 μm diameter sphere). Even more preferably, the abrasive particles used at the end of polishing are at least as fine as 0-2 μm grade particles, which means that the particles have a diameter of 2 μm or less (each abrasive particle can be contained in a 2 μm diameter sphere). Preferably, the abrasive particles used at the end of polishing are made of diamond. For the very final polishing step, by way of example, about 20 mg of 0-2 μm grade diamond powder may be used for a 10 cm diameter polisher.

The quality of the polish of the "polished first face" may be controlled by measuring the energy resolution PHR and a signal-to-noise ratio (the P/V ratio is measured as explained below with FIG. 2) when the polished face is exposed to the radiation from an $Fe^{55}$ source at 5.9 keV. The polished first face is therefore finely polished (by progressively reducing the size of the abrasive particles, the amount of abrasive particles in the alcohol, and by progressively increasing the duration of polishing) preferably until the PHR is lower than 55%, and even less than 50%, when the face is exposed to the radiation from an $Fe^{55}$ source at 5.9 keV. Preferably the polishing is fine enough that the P/V ratio is 35 or more and even 40 or more and even 45 or more when this polished first face is exposed to the radiation from an $Fe^{55}$ source at 5.9 keV. Preferably, the polished first face is polished finely enough that the energy resolution PHR is at most equal to 107% of the energy resolution measured on a single crystal of identical composition and identical exterior form, except on that the polished first face is replaced with a cleaved face (this may be any cleaved face and any crystal orientation, because the nature of the cleaved face does not significantly affect the PHR).

Generally, all these surface preparation actions (after machining and up to the final polished face being obtained) remove 0.1 mm to 1.5 mm of material thickness.

The entire operation is carried out in a moisture-free atmosphere. After the worked thickness of the crystal has been removed, the polished first face is ready to detect low-energy rays or particles.

The crystal is then incorporated into a detector. The detector comprises the scintillator crystal and a photoreceiver. The polished first face is the entrance face for the ionizing radiation. The face opposite this entrance face is optically coupled to a light guide or an entrance window of a photoreceiver such as a photomultiplier or a photodiode—this face may be called the "coupled face". Generally, the polished first face is parallel to the coupled face. Generally the polished first face contains that point of the crystal away furthest from the center of gravity of the coupled face. If the coupled face is a disk, the center of gravity of the coupled face is the center of this disk. Generally the coupled face is planar.

There is no particular limit to the size of the crystal. Generally, the latter has a volume between 25 $mm^3$ and 1000 cm³. The crystal may be any shape such as a parallelepiped, a cylinder, a truncated pyramid or a truncated cone. The radiation entrance face ("polished first face") is polished so as to improve the quality of the interaction of low-energy ionizing radiation in the scintillator. This face is generally planar. The finish of the other surfaces of the crystal is determined by optical considerations: they may also be polished (which enables the light to be guided by total internal reflection), or roughened (to produce a scattering effect). When they are polished, their preparation does not have to follow the protocol described above because their polish does not require the same quality (or fineness). Here the polish may be a single step, for example with an alcohol/alumina mixture. The abrasive particles used for at least one face other than the polished first face may be 0-10 μm grade alumina, which means that the alumina particles have a diameter of 10 μm or less (each abrasive particle can be contained in a 10 μm diameter sphere). It is also possible to use 0-2 μm grade alumina, which means the alumina particles have a diameter of 2 μm or less (each abrasive particle can be contained in a 2 μm diameter sphere).

The crystal may be incorporated into a simple assembly (radiation entrance window, crystal and light guide for extracting the scintillation light), or into a more complicated assembly (radiation entrance window, polished crystal and photoreceivers, with or without electronics).

The crystal is a single crystal. It is based on a rare-earth halide so that it contains at least 50 wt % of rare-earth halide.

In particular, the crystal composition may correspond to the formula $A_n Ln_p X_{(3p+n)}$ in which: Ln represents one or more of the rare-earth elements, i.e. an element chosen from Y, Sc and the lanthanide series extending from La to Lu; X represents one or more halogen atoms chosen from Cl, Br and I; A represents one or more alkali metals such as Li, Na, K, Rb or Cs; and n and p are numbers such that n is greater than or equal to zero and less than or equal to 3 and p is greater than or equal to 1.

In particular, the rare-earth halide may be a chloride or a bromide. The rare earth may be lanthanum. The rare-earth halide may be a praseodymium- or cerium-doped lanthanum bromide or chloride.

The invention especially relates to crystals of hexagonal crystal structure of P6₃/m space group, which especially includes $LaCl_3$, $CeCl_3$, $NdCl_3$, $PrCl_3$, $SmCl_3$, $EuCl_3$, $GdCl_3$, $LaBr_3$, $CeBr_3$, $PrBr_3$, or any mixture of at least two of these halides (especially $LaCl_3$ and $LaBr_3$, this mixture possibly being doped with a dopant such as Ce or Pr), these halides possibly being doped with a dopant such as Ce or Pr.

The crystal according to an embodiment of the invention serves as a scintillator material for the detection of ionizing radiation. It is particularly advantageous for detecting low-energy radiation requiring a high count rate (because the duration of the light pulses of rare-earth halide crystals can be shorter than that of other scintillator materials such as NaI(Tl)), but also a good spectral resolution (at least equivalent to that of NaI(Tl)). As a potential application of this crystal, mention may be made of detectors incorporated into X-ray fluorescence spectrometers (for quantitative and qualitative analysis of materials) and used for the detection and/or the characterization of physical phenomena (X-rays emitted by a synchrotron, etc.).

FIG. 1 shows the assembly of a scintillator crystal 1, based on a rare-earth halide, with a photomultiplier tube 2. The top face 3 of the crystal is the sensitive face that receives the ionizing radiation. This finely polished surface is the polished first face. The dashed line 4 shows that a crystal cleavage plane is randomly positioned, and does not necessarily correspond to the plane of the face 3. The face 5 is the face coupled to the photomultiplier 2. This assembly is then hermetically sealed in a housing not shown.

Figure 2:
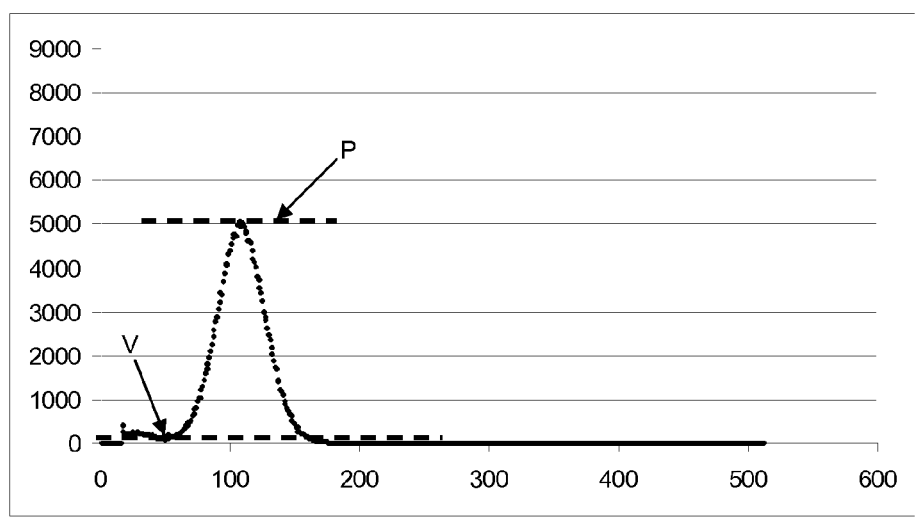
FIG. 2 includes a spectrum of a n Fe55 source at 5.9 keV in the case of a NaI crystal.

FIG. 2 shows the typical spectrum of an $Fe^{55}$ source at 5.9 keV in the case of a NaI crystal with a cleaved surface (prior art). The y-axis shows the number of counts measured by a counter and the x-axis shows the channels, after analysis using a multichannel analyzer (MCA), of the voltage delivered by the photoreceiver. The channel unit on the x-axis represents directly the light level emitted by the scintillator material. The maximum of the peak gives the value P of the P/V ratio. The valley gives the value V of the P/V ratio. The peak-to-valley ratio P/V is here 73 and the energy resolution (PHR) is 35%.

EXAMPLES

Crystals of NaI(Tl) and $LaCl_3$(Ce) were machined (the latter being marketed by Saint-Gobain Crystals and Detectors under the brand name BrilLanCe 350) into disks having diameters of 30.0 mm and heights of 3.5 mm, including a thickness allowance of 0.25 mm on the faces intended to be polished. For the machining, the crystals had a random orientation:

the sensitive, radiation entrance face was polished in the way described above (polished first face); and the face coupled to the photodetector (which was a photomultiplier) was also polished, but in a simpler and less involved way, i.e. by abrasion with alumina diluted in alcohol—this polishing having only an optical function.

For the purposes of comparison, identical crystals were produced, but with the sensitive face obtained by cleaving. For comparison, specimens were also prepared with the ionizing-radiation-receiving face sandblasted or scratched (rubbed with glass paper).

The face opposite the radiation entrance face was bonded, with an epoxy resin, to the photocathode window of a photomultiplier tube. The assembly is shown in FIG. 1. This assembly was then hermetically sealed in a housing.

The energy resolution (PHR) and the peak-to-valley ratio (P/V) measurement results are collated in table 1, for an $Fe^{55}$ source emitting at 5.9 keV.

TABLE 1

|  | Cleaved | | Polished | | Sandblasted | | Scratched | |
| --- | --- | --- | --- | --- | --- | --- | --- | --- |
|  | PHR at 5.9 keV | P/V at 5.9 keV | PHR at 5.9 keV | P/V at 5.9 keV | PHR at 5.9 keV | P/V at 5.9 keV | PHR at 5.9 keV | P/V at 5.9 keV |
| NaI(Tl) | 38% | 54 | Not measureable | | Not measureable | | Not measureable | |
| $LaCl_3$(Ce) | 47% | 47 | 48% | 48 | Not measureable | | Not measureable | |

In this table:

PHR is the energy resolution (pulse height resolution). This measurement consists in recording a spectrum representing the activity of a source as a function of energy, this spectrum describing the full width at half maximum of a peak divided by the energy (abscissa of the peak maximum) gives the PHR—the lower the PHR, the better the spectral resolution. The average value for 10 specimens is given; and P/V represents the "peak-to-valley ratio" which is obtained by dividing the number of counts detected at the maximum of the peak of the source by the minimum number of counts between the source peak and the noise peak present in the low channels (to the left of the peak at 5.9 keV)—the higher the P/V ratio, the better the signal-to-noise ratio. The average value for 10 specimens is given.

A person skilled in the art would consider the following performance in the case of an $Fe^{55}$ source at 5.9 keV to be satisfactory: PHR≤50% and P/V≥35.

In the case of polished NaI(Tl), the quantity of light extracted is so small that the source peak is indiscernible above the noise, which is why the table states "Not measureable". Furthermore, the crystals the ionizing-radiation interaction face of which had been sandblasted or glass-papered did not give useful signals.

The performance parameters were presented in the table measured using identical photomultipliers and with the same acquisition apparatus, at a temperature of 22° C.

The invention claimed is:

1. A scintillation detector for detecting incident radiation belonging to a range from 1 to 100 keV, comprising a single-crystal scintillator material and a photoreceiver,
said single-crystal scintillator material comprising:
a flat polished radiation entrance face;
a coupled face opposite the radiation entrance face, the coupled face being rougher than the radiation entrance face and coupled to the photoreceiver; and
at least 50 wt % of rare-earth halide,
wherein the scintillator detector has an energy resolution value PHR lower than 55% when the polished radiation entrance face is exposed to a radiation from an $Fe^{55}$ source at 5.9 keV; and
wherein the flat polished radiation entrance face has a roughness of 2 microns or less.

2. The scintillation detector of claim 1, wherein the single-crystal scintillator material has a composition represented by $A_nLn_pX_{(3p+n)}$, wherein:
Ln comprises one or more of a rare-earth element;
A comprises one or more of an alkali metal;
X is chloride or bromide;
3≥n≥0; and
p≥1.

3. The scintillation detector of claim 2, wherein the rare earth is lanthanum.

4. The scintillation detector of claim 2, wherein the rare-earth halide is praseodymium-doped lanthanum chloride or cerium-doped lanthanum chloride.

5. The scintillation detector of claim 1, wherein when the polished radiation entrance face is exposed to a radiation from an $Fe^{55}$ source at 5.9 keV, the detector has a peak-to-valley ratio P/V of 35 or more.

6. The scintillation detector of claim 1, wherein the polished radiation entrance face is capable of achieving the energy resolution PHR that is at most equal to 107% of the energy resolution measured on a single crystal of identical composition and identical exterior form, except that the polished radiation entrance face is replaced with a cleaved face.

7. The scintillation detector of claim 1, wherein the polished radiation entrance face contains a point of the scintillator material furthest away from a center of gravity of the coupled face.

8. The scintillation detector of claim 1, wherein the polished radiation entrance face is least rough among all surfaces of the single-crystal scintillator material.

9. A scintillation detector for detecting incident radiation belonging to a range from 1 to 100 keV, comprising a single-crystal scintillator material and a photoreceiver,
said single-crystal scintillator material comprising:
a flat polished radiation entrance face;
a coupled face opposite the polished radiation entrance face, the coupled face being rougher than the polished radiation entrance face and coupled to the photoreceiver; and
at least 50 wt % of rare-earth halide,
wherein:
the rare-earth halide is a chloride or bromide; and
when the polished radiation entrance face is exposed to a radiation from an $Fe^{55}$ source at 5.9 keV, the scintillation detector has a peak-to-valley ratio P/V of 35 or more; and
wherein the flat polished radiation entrance face ahas a roughness of 2 microns or less.

10. The scintillation detector of claim 9, wherein the rare earth is lanthanum.

11. The scintillation detector of claim 9, wherein the rare-earth halide is praseodymium-doped lanthanum chloride or cerium-doped lanthanum chloride.

12. The scintillation detector of claim 9, wherein when the polished radiation entrance face is exposed to a radiation from an $Fe^{55}$ source at 5.9 keV, the detector has an energy resolution value PHR lower than 55%.

13. The scintillation detector of claim 9, wherein the polished radiation entrance face contains a point of the scintillator material furthest away from a center of gravity of the coupled face.

14. The scintillation detector of claim 9, wherein the polished first face is capable of achieving the energy resolution PHR that is at most equal to 107% of the energy resolution measured on a single crystal of identical composition and identical exterior form, except that the polished first face is replaced with a cleaved face.

15. A method of detecting radiation comprising:
providing a scintillation detector for detecting a radiation having an energy in a range from 1 to 100 keV, wherein the scintillation detector comprises:
a single-crystal scintillator material and a photoreceiver, said single-crystal scintillator material comprising:
at least 50 wt % of rare-earth halide;
a flat polished radiation entrance face having a roughness of 2 microns or less; and
a coupled face opposite the radiation entrance face and coupled to the photoreceiver, the coupled face being rougher than the radiation entrance face,
wherein the scintillator detector has an energy resolution value PHR lower than 55% when the polished radiation entrance face is exposed to a radiation from an $Fe^{55}$ source at 5.9 keV;
receiving the radiation having the energy in the range of 1 to 100 keV at the flat polished radiation entrance surface; and detecting the radiation having the energy in the range from 1 to 100 keV.

16. The method of claim 15, wherein the radiation has an energy lying in the range from 1 to 50 keV.

17. The method of claim 15, wherein the radiation has an energy lying in the range from 1 to 10 keV.

18. A method of detecting radiation comprising:
providing a scintillation detector for detecting a radiation having an energy in a range from 1 to 100 keV, wherein the scintillation detector comprises:
a single-crystal scintillator material and a photoreceiver, said single-crystal scintillator material comprising:
at least 50 wt % of rare-earth halide;
a flat polished radiation entrance face having a roughness of 2 microns or less; and
a coupled face opposite the radiation entrance face and coupled to the photoreceiver, the coupled face being rougher than the radiation entrance face,
wherein the scintillator detector has a peak-to-valley ratio P/V of 35 or more when the polished radiation entrance face is expose d to a radiation from an $Fe^{55}$ source at 5.9 keV;
receiving a radiation having the energy in the range of 1 to 100 keV at the flat polished radiation entrance surface; and
detecting the radiation having the energy in the range from 1 to 100 keV.

19. The method of claim 18, wherein the radiation has the energy in the range from 1 to 50 keV.

20. The method of claim 18, wherein the radiation has the energy in the range from 1 to 10 keV.

* * * * *